US012558201B2

(12) United States Patent (10) Patent No.: US 12,558,201 B2
Fecher et al. (45) Date of Patent: Feb. 24, 2026

(54) BLANK FOR MILLING OR GRINDING A DENTAL ARTICLE

(71) Applicant: DENTSPLY SIRONA Inc., York, PA (US)

(72) Inventors: Stefan Fecher, Johannesberg (DE); Lothar Völkl, Goldbach (DE); Markus Vollmann, Geinhausen (DE); Andreas Gebhardt, Langenselbold (DE)

(73) Assignee: Dentsply Sirona, Inc., York, PA (US)

( * ) Notice: Subject to any disclaimer, the term of this patent is extended or adjusted under 35 U.S.C. 154(b) by 601 days.

(21) Appl. No.: 17/435,420

(22) PCT Filed: Mar. 11, 2020

(86) PCT No.: PCT/EP2020/056505
§ 371 (c)(1),
(2) Date: Sep. 1, 2021

(87) PCT Pub. No.: WO2020/182884
PCT Pub. Date: Sep. 17, 2020

(65) Prior Publication Data
US 2022/0175500 A1 Jun. 9, 2022

(30) Foreign Application Priority Data
Mar. 11, 2019 (EP) ..................................... 19161781

(51) Int. Cl.
*A61C 13/00* (2006.01)
*A61C 13/08* (2006.01)
*A61C 13/083* (2006.01)

(52) U.S. Cl.
CPC ...... *A61C 13/0022* (2013.01); *A61C 13/0004* (2013.01); *A61C 13/082* (2013.01); *A61C 13/083* (2013.01); *A61C 2201/002* (2013.01)

(58) Field of Classification Search
CPC ............ A61C 13/0022; A61C 13/0004; A61C 13/082; A61C 13/083; A61C 2201/002
See application file for complete search history.

(56) References Cited

U.S. PATENT DOCUMENTS

2008/0193899 A1* 8/2008 Karlsson ............ A61C 13/0003
433/203.1
2009/0023112 A1* 1/2009 Ganley .............. A61C 13/0022
409/117

(Continued)

FOREIGN PATENT DOCUMENTS

DE 102014104401 A1 10/2015
EP 2016922 A2 1/2009

(Continued)

OTHER PUBLICATIONS

International Search Report; PCT/EP2020/056505; May 4, 2020 (completed); May 13, 2020 (mailed).

(Continued)

*Primary Examiner* — Alicia J Weydemeyer
*Assistant Examiner* — Laura B Figg
(74) *Attorney, Agent, or Firm* — SCHWEGMAN LUNDBERG & WOESSNER, P.A.

(57) ABSTRACT
A blank for milling or grinding a dental article, the blank having a plate-shaped body adapted to be received in a blank holder of a CAM system, which plate-shaped body comprises one or more ceramic or glass ceramic blank portions and two or more through holes, wherein each through hole is contiguous with at least one of the ceramic or glass ceramic blank portions for receiving a working end of a milling or grinding tool of the CAM system.

13 Claims, 4 Drawing Sheets

(56)                    References Cited

U.S. PATENT DOCUMENTS

| | | | |
|---|---|---|---|
| 2015/0125822 A1 | 5/2015 | Cramer Von Clausbruch | |
| 2016/0317258 A1 | 11/2016 | Steger | |
| 2017/0056137 A1 | 3/2017 | Matsui | |
| 2017/0319304 A1* | 11/2017 | Borowski | .......... A61C 13/0022 |

FOREIGN PATENT DOCUMENTS

| | | | |
|---|---|---|---|
| EP | 3095412 A2 | 11/2016 | |
| EP | 3708114 A1 | 9/2020 | |
| EP | 3937842 A1 | 1/2022 | |
| EP | 3937842 B1 | 8/2024 | |
| JP | 2010131395 A | 6/2010 | |
| JP | 2015511848 A | 4/2015 | |
| JP | 2017047175 A | 3/2017 | |
| JP | 2017538472 A | 12/2017 | |
| JP | 2022525094 A | 5/2022 | |
| JP | 7618571 | 1/2025 | |
| WO | WO-2020182884 A1 | 9/2020 | |

OTHER PUBLICATIONS

Written Opinion of the International Searching Authority; PCT/EP2020/056505; May 4, 2020 (completed); May 13, 2020 (mailed).
International Preliminary Report on Patentability; PCT/EP2020/056505; May 4, 2020 (completed); May 13, 2020 (mailed).
"European Application Serial No. 19161781.0, Extended European Search Report mailed Jul. 22, 2019", 7 pgs.
"European Application Serial No. 20709591.0, Communication Pursuant to Article 94(3) EPC mailed Jun. 5, 2023", 5 pgs.
"European Application Serial No. 20709591.0, Communication Pursuant to Article 94(3) EPC mailed Jul. 7, 2022", 6 pgs.
"European Application Serial No. 20709591.0, Communication Pursuant to Article 94(3) EPC mailed Sep. 13, 2022", 8 pgs.
"European Application Serial No. 20709591.0, Response filed Feb. 7, 2023 to Communication Pursuant to Article 94(3) EPC mailed Sep. 13, 2022", 12 pgs.
"European Application Serial No. 20709591.0, Response filed Jul. 11, 2023 to Communication Pursuant to Article 94(3) EPC mailed Jun. 5, 2023", 12 pgs.
"European Application Serial No. 20709591.0, Response filed Jul. 19, 2022 to Communication Pursuant to Article 94(3) EPC mailed Jul. 7, 2022", 12 pgs.
"European Application Serial No. 20709591.0, Response to Communication pursuant to Rules 161(2) and 162 EPC filed Apr. 20, 2022", 11 pgs.
"Japanese Application Serial No. 2021-554657, Notification of Reasons for Rejection mailed Jan. 18, 2024", W/English Translation, 10 pgs.
"Japanese Application Serial No. 2021-554657, Notification of Reasons for Rejection mailed Jun. 26, 2024", W/English Translation, 6 pgs.
"Japanese Application Serial No. 2021-554657, Response filed Apr. 8, 2024 to Notification of Reasons for Rejection mailed Jan. 18, 2024", W/English Claims, 20 pgs.

* cited by examiner

BLANK FOR MILLING OR GRINDING A DENTAL ARTICLE

CROSS-REFERENCE TO RELATED APPLICATIONS

This is a National Phase application of International Application No. PCT/EP2020/056505, filed Mar. 11, 2020, which claims the benefit of and priority to EP Application Serial No. 19161781.0, filed on Mar. 11, 2019, which are herein incorporated by reference for all purposes.

FIELD OF THE INVENTION

The present invention relates to a blank for milling or grinding a dental article. The present invention also relates to a kit-of-parts comprising at least two blanks according to the present invention, which are different in color or shade. Furthermore, the present invention relates to a process for preparing a blank according to the present invention. Moreover, the present invention relates to a subtractive process for preparing one or more dental articles, wherein a blank of the present invention is used. Moreover, the present invention relates to a computer-implemented method for preparing a dental article, wherein a blank of the present invention is used. Finally, the present invention relates to a non-transitory, computer-readable medium comprising a program executable for carrying out the computer-implemented method for preparing a dental article according to the present invention and further comprising a digital representation of a blank of the present invention.

The blank of the present invention may be used for the preparation of dental articles by machining with a dental CAD/CAM system. A blank according to the present invention allows to quickly and efficiently prepare multiple dental articles without being limited to a predetermined type or shape of the dental article, whereby the blank optimizes the service life of the milling or grinding tools despite the high mechanical strength of the ceramic or glass ceramic material from which the dental articles are prepared, while helping to reduce inventory of blanks and thereby reducing operating costs associated with CAD/CAM systems.

BACKGROUND OF THE INVENTION

The preparation of dental articles from ceramic materials by a subtractive process is known. CAD/CAM systems are used to design dental articles by computers and to fabricate the designs by machining with milling or grinding machines from ceramic or glass ceramic blanks. For example, the inLab MC X5 (DentsplySirona) is a universal production unit for processing glass ceramic, zirconia, polymers, composites, wax and sintering metal. From the prior art, disks having a diameter of about 98 mm are known which may be mounted on the blank holder of a CAD/CAM system. In order to secure the disk in the blank holder, an annular adapter is provided at the circumference of the disk. In order to be able to place the disk in a predetermined position, the disk may be provided with a recess engaging a protrusion of the blank holder.

Due to the high mechanical resistance of densely sintered ceramic materials or glass ceramic materials, the wear of milling and grinding tools is excessive and their service life is limited. As a consequence, generic disks made of densely-sintered ceramic or glass ceramic material are unknown. Rather, a pre-sintered ceramic material is used for shaping the dental article which is subsequently heat treated in order to prepare the final dental article. For example, U.S. Pat. No. 6,354,836 discloses ceramic precursor powders combined with a binder and pressed into blocks or similar shapes to form green bodies. The green bodies are soft-sintered to a density less than about eighty five percent of the final density. The soft-sintered blocks may then be milled to a desired shape and sintered to a final density for providing a high strength dental restorative material. However, given the high shrinkage rate of the ceramic material during sintering and the time required for the heating step, such a process is still time-consuming.

In order to reduce the processing times for producing a dental shaped part from ceramic blocks, notably for avoiding the sintering process, US 2015/0125822 discloses a blank in the form of a disk which has at least one preform of a dental crown. The preforms in the blank are machined to prepare the desired shape of the dental crown by cutting, sawing, grinding, drilling and/or milling. A blank according to US 2015/0125822 is a three-dimensional body which, in terms of its dimensions and/or its shape/design, is approximated or adapted to the dimensions and/or the shape/design of the dental shaped part that is to be produced. Accordingly, the preparation of the dental shaped part from the blank is facilitated because of the at least partly adapted or anticipated dimensions and/or shapes of the preform.

However, the blanks according to US 2015/0125822 cannot be efficiently used in practice. Given that the preforms require highly precise positioning of the blank in the blank holder, any imprecision may lead to dental articles with defects when the preforms are misplaced in the holder.

Moreover, given that the occlusion depends on the size of a tooth, the preforms suggested by US 2015/0125822 must be provided in different sizes for each type of dental article so as to allow the preparation of teeth, notably molars, of different sizes. Given that differences in tooth color already require the stocking of multiple different blanks of different color, the necessity for preforms for different types and sizes of dental articles requires that the dental practitioner acquires a large number of different blanks.

Moreover, given that blanks according to US 2015/0125822 must be frequently selected with regard to a specific blank, the frequent change of the blanks cannot be avoided which is time consuming and leads to potential imprecision in the placement of the blank.

EP 2 016 922 discloses a cluster mill blank including a framework constructed to cooperate with a blank holder of an existing CAD/CAM system, and a plurality of sub-blanks attached to the framework forming an addressable matrix or cluster blank. The sub-blanks may comprise a lithium silicate-based glass ceramics, which can be processed by machining into dental articles. A blank disclosed by EP 2 016 922 is intended to maximize yield per blank, and to reduce material waste.

SUMMARY OF THE INVENTION

According to a first aspect, it is a problem of the present invention to provide a blank for milling or grinding a dental article, which may be used to quickly and efficiently prepare multiple dental articles without being limited to a predetermined shape, whereby the blank optimizes the service life of the milling or grinding tools despite the high mechanical strength of the ceramic or glass ceramic material from which the dental articles are prepared, while helping to reduce inventory of blanks and thereby reducing operating costs associated with CAD/CAM systems.

According to a second aspect, it is a problem of the present invention to provide a kit-of-parts comprising at least two blanks of the present invention which may be used to quickly and efficiently prepare multiple dental articles of different color without being limited to a predetermined shape, whereby the blank optimizes the service life of the milling or grinding tools despite the high mechanical strength of the ceramic or glass ceramic material from which the dental articles are prepared, while helping to reduce inventory of blanks and thereby reducing operating costs associated with CAD/CAM systems.

According to a third aspect, it is a problem of the present invention to provide a process for preparing a blank which process may be used to quickly and efficiently prepare a blank.

According to a fourth aspect, it is a problem of the present invention to provide a subtractive process for quickly and efficiently preparing multiple dental articles without being limited to a predetermined shape, whereby the wear of the milling or grinding tools is reduced so that the service life is extended despite the high mechanical strength of the ceramic or glass ceramic material from which the dental articles are prepared.

According to a fifth aspect, it is a problem of the present invention to provide a computer-implemented method for preparing a dental article which may be used to quickly and efficiently prepare multiple dental articles without being limited to a predetermined shape, and whereby the positioning of the blank is simple or straightforward and does not give rise to defects due to imprecision of placement of the blank, whereby at the same time the blank optimizes the service life of the milling or grinding tools despite the high mechanical strength of the ceramic or glass ceramic material from which the dental articles are prepared.

According to a sixth aspect, it is a problem of the present invention to provide non-transitory, computer-readable medium which may be used to quickly and efficiently prepare multiple dental articles without being limited to a predetermined shape, and whereby the positioning of the blank is simple or straightforward and does not give rise to defects due to imprecision of placement of the blank, whereby at the same time the blank optimizes the service life of the milling or grinding tools despite the high mechanical strength of the ceramic or glass ceramic material from which the dental articles are prepared.

According to a first aspect, the present invention provides a blank for milling or grinding a dental article, the blank having a plate-shaped body adapted to be received in a blank holder of a CAM system, which plate-shaped body comprises one or more ceramic or glass ceramic blank portions and two or more through holes, wherein each through hole is contiguous with at least one of the ceramic or glass ceramic blank portions for receiving a working end of a milling or grinding tool of the CAM system.

According to a second aspect, the present invention provides a kit-of-parts comprising at least two blanks as defined by the present invention according to the first aspect, wherein each blank is coded to identify the color of the one or more ceramic or glass ceramic blank portions.

According to a third aspect, the present invention provides a process for preparing a blank as defined by the present invention according to the first aspect, which comprises forming two or more through holes at two or more predetermined locations on the surface of a plate-shaped body adapted to be received in a blank holder of a CAM system.

According to a fourth aspect, the present invention provides a subtractive process for preparing one or more dental articles, comprising the following steps:

(i) providing a blank as defined by the present invention according to the first aspect;

(ii) mounting the blank on a blank holder of a CAM system, wherein the CAM system further comprises a milling or grinding machine comprised of a milling or grinding tool having a working end;

(iii) positioning the working end of the milling or grinding tool in a preformed through hole of the blank, adjacent to a flat or concave inner wall of the preformed through hole; and (iv) enlarging the preformed through hole by milling or grinding the flat or concave inner wall of the preformed through hole with the working end of the milling or grinding tool so that at least a portion of a convex contour of the dental article is prepared.

According to a fifth aspect, the present invention provides a computer-implemented method for preparing a dental article which comprises the steps of:

(a) determining the type of a blank having two or more preformed through holes as defined by the present invention according the first aspect, mounted on a blank holder of a milling machine of a CAM system;

(b) controlling the CAM system so that a working end of a milling or grinding tool of the milling machine is received in a preformed through hole of the blank;

(c) controlling the working end of the milling or grinding tool so that the preformed through hole is enlarged by the tool into at least a portion of a convex contour of the dental article.

According to a sixth aspect, the present invention provides a non-transitory computer-readable medium comprising a program executable for carrying out the computer-implemented method for preparing a dental article according to the invention, and further comprising a digital representation of a blank as defined by the present invention.

The present invention is based on the recognition that a deterioration or worsening of the useful service life (i.e., operational performance) of the milling and grinding tools may be hastened due to excessive tool wear occurring when the tool moves along its longitudinal axis through a blank made of dense ceramic or glass ceramic. Accordingly, the tool is quickly unable to perforate the blank, even while lateral portions of the tool continue to be useful for machining the dental article. Moreover, the present invention is based on the recognition that the useful service life of the milling and grinding tools may be significantly extended by providing two or more through holes in a blank, which are contiguous with ceramic or glass ceramic blank portions for receiving a working end of a milling or grinding tool of the CAM system for milling or grinding a dental article, so that the entry of the tool along its longitudinal axis by milling or grinding through the hard ceramic or glass ceramic material is avoided.

DETAILED DESCRIPTION OF PREFERRED EMBODIMENTS

Figure 1:
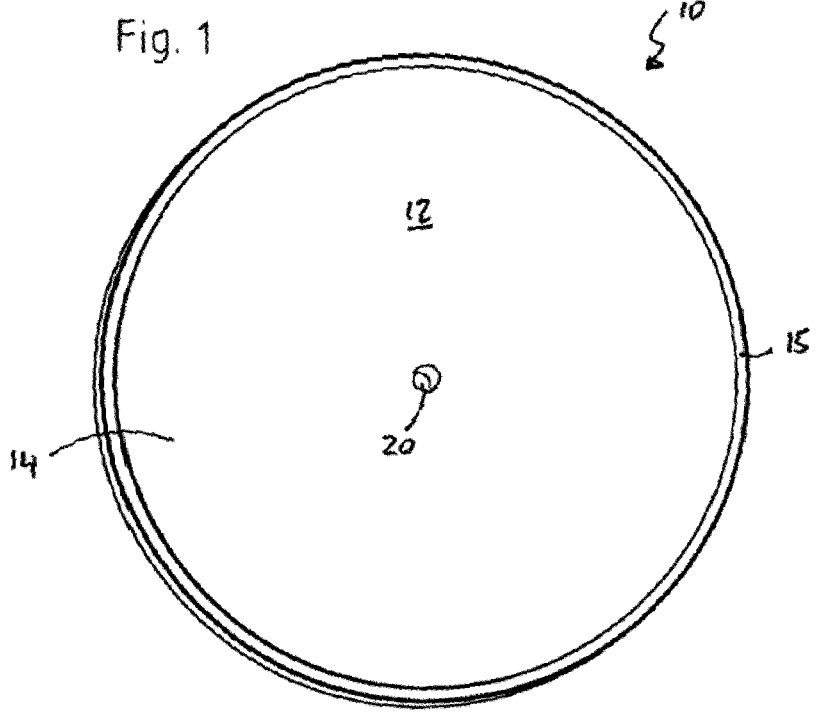
FIG. 1 shows a first embodiment of a blank of the present invention, wherein a plate-shaped body is a blank portion entirely comprised of a ceramic or glass ceramic material, wherein a single through hole is formed.

The term "dental article" is to be understood as an article which can be used in the dental and/or orthodontic field, including dental laboratories. A typical example of a dental article is an indirect dental restoration. The term "indirect dental restoration" includes any dental restoration shaped outside the buccal cavity of the patient and which can be used in the dental field such as inlays, onlays, veneers, crowns, bridges, abutments, dental posts, dentures, denture bases, and implant members. For this purpose, the dental restoration must provide sufficient mechanical properties such as a Vickers hardness (HV1) of at least 400 MPa (ISO 6507-1:2005(E)). Dental restorations may be comprised of a dental support structure and a dental veneer or facing.

The term "glass" refers to an amorphous, non-crystalline solid, and may be described thermodynamically as frozen, supercooled liquid. Examples are oxidic glasses, in particular boron silicate glasses, aluminosilicate glasses or lithium silicate glasses.

The term "ceramic" refers to an inorganic non-metallic material. Ceramics are usually hard, porous and brittle and, in contrast to glasses or glass ceramics, display an essentially purely crystalline structure.

The term "glass ceramic" refers to an inorganic non-metallic material where one or more crystalline phases are surrounded by a glassy phase.

The term "machining" refers to milling, grinding, cutting, carving, or shaping a material by a machine.

A dental ceramic article is classified as "pre-sintered" if the dental ceramic article has been treated with heat at a temperature range from 900 to 1100° C. for 1 to 3 h. A pre-sintered dental ceramic article typically has a porous structure and its density is at least 10 percent less compared to a completely sintered dental ceramic article. A pre-sintered blank portion or dental article may be referred to as a green body. The present invention does not relate to pre-sintered blank portions having a Vickers hardness (HV1) of less than 400 MPa (ISO 6507-1:2005(E)).

The term "sintering" refers to the densification of a porous material such as a green body, to a less porous material having a higher density.

The term "casting" refers to a manufacturing process by which a liquid material is poured into a hollow cavity of the desired shape of a mould, and then allowed to solidify.

The "aspect ratio" is a dimensionless shape factor to numerically describe the shape of a blank, independent of its size, based on the length and thickness of the blank. In case of a circular blank, the relevant length is the diameter of the circular plate-shaped body. In case of a non-circular shape, the relevant length is the greatest dimension of the plate-shaped body in a direction perpendicular to the thickness of the plate-shaped body. The thickness direction coincides with the direction of the two or more through holes of the blank.

The Blank

The present invention provides a blank for milling or grinding a dental article. The dental article may be any indirect restoration including inlays, onlays, veneers, crowns, bridges, abutments, dental posts, dentures, denture bases, and implant members. Preferably, the dental article is selected from crowns, bridges, inlays and abutments.

The blank has a plate-shaped body adapted to be received in a blank holder of a CAM system. According to a preferred embodiment, an adapter is provided which holds the plate-shaped body at the circumference and which is designed to form-fit into the blank holder of a CAM system. For this purpose, the blank preferably has one or more slots at the circumference of the plate-shaped body for orienting the blank in a blank holder of a CAM system. The blank may be provided with additional elements which facilitate the orientation of the blank in the blank holder. In particular, in case of a circular disk, indentations may be provided which are designed to be mated with corresponding protrusions of the blank holder when the blank is mounted in the blank holder.

The contour of the plate-shaped body is not particularly limited and may be selected from circular, elliptical, rectangular, or polygonal.

According to a preferred embodiment, the plate-shaped body of the blank has an aspect ratio (diameter/thickness) of at least 3, more preferably at least 4.

It is preferred that the plate-shaped body is a circular disk. Preferably, the disk has a diameter of at least 50 mm, more preferably, the disk has a diameter of at least 70 mm. According to a specific embodiment, the plate-shaped body is a disk having a diameter of at least 95 mm, in particular 98.5 mm.

The thickness of the plate-shaped body may be in the range from 3 to 35 mm, more preferably 7 to 25 mm and may be suitably selected based on the dental articles to be prepared with the blank.

The plate-shaped body comprises one or more ceramic or glass ceramic blank portions. According to a specific embodiment, the plate-shaped body comprises a single ceramic or glass ceramic blank portion. Accordingly, the plate-shaped body may consist essentially of a ceramic or glass ceramic material. The plate-shaped body may further comprise an adapter. The adapter may be fixed to the plate-shaped body by any suitable means including an adhesive. The adapter may be provided at the circumference of the plate-shaped body. The material of the adapter is not specifically limited, and may preferably be selected from fiber- or particle-reinforced resins. The ceramic or glass ceramic blank portion may be used for the preparation of one or more dental articles. The preparation of multiple dental articles from a single ceramic or glass ceramic blank portion preferably is carried out by positioning the milling silhouette of the first dental articles adjacent to a through hole of the blank portion, and the milling silhouette of any further dental article adjacent to the through hole resulting from the preparation of the previous one or more dental articles. The milling silhouettes of the dental article are designed and stored for use by the CAD software controlling the CAM machine.

According to a further specific embodiment, the plate-shaped body comprises a framework having a plurality of openings adapted to hold ceramic or glass ceramic blank portions. Accordingly, the plate-shaped body comprises at least two and preferably four or more individual ceramic or glass ceramic blank portions. Accordingly, the present invention provides a blank comprising a plate-shaped body adapted to cooperate with a blank holder of an existing CAD/CAM system, and a plurality of blank portions comprised in the plate-shaped body of the blank. The plate-shaped body may further comprise an adapter. The adapter may be fixed to the plate-shaped body by any suitable means including an adhesive. The adapter may be provided at the circumference of the plate-shaped body. The material of the adapter is not specifically limited, and may preferably be selected from fiber- or particle-reinforced resins. Blanks may be formed from individual blank portions using pre-fabricated or custom-made frameworks to enable use of the individual blanks in different systems. The frameworks may be made of any suitable material having sufficient strength for holding the blank portions during preparation of dental articles. Examples of suitable materials are ceramic materials, glass ceramic materials, metals, resins, composites and combinations thereof.

A plate-shaped body may comprise the same individual blanks portions of identical size and shade, or different shades of the same size and type blank portions. P late-shaped bodies can also comprise various sizes and shades of the same blank portion material and also a variety of different types of blank portions from one or different manufacturers can be assembled on the same framework to make a hybrid blank.

The blank portions may be attached permanently or releasably to the framework of the plate-shaped body by any suitable method. Examples of a suitable method include methods involving gluing, sintering, soldering, brazing, adhesives, nuts and bolts and washers, knock-down fittings, and screws.

The blank portions do not contain a preform which is a three-dimensional body which, in terms of its dimensions and/or its shape/design, is approximated or adapted to the dimensions and/or the shape/design of the dental shaped part that is to be produced. Rather, the overall shape of the blank portions ignoring any through holes may be selected from a simple three-dimensional geometric shape including a cuboid, a cube, a cylinder, or a polygonal prism such as a trigonal prism, a pentagonal prism or a hexagonal prism. A cuboid and a cylinder are preferred. In case of a cuboid shape, the dimensions of the blank portions are preferably in the range of 1 to 5 cm:1 to 5 cm:0.5 to 3 cm. In case of a cylindrical shape, the dimensions of the blank portion preferably coincide with the dimensions of the plate-shape body and are preferably in the range of 5 to 10 cm:0.5 to 3 cm.

The blank portions are comprised of ceramic or glass ceramics having a high hardness. At least one of the blank portions is not a green body. Rather, the blank portions preferably have a Vickers hardness (HV1) of at least 400 MPa (ISO 6507-1:2005(E)). More preferably, the blank portions have a Vickers hardness (HV1) of at least 500 MPa, still more preferably, at least 600 MPa. Accordingly, the dental articles prepared based on the ceramic blank portions of the present invention do not need to be sintered to a final density after machining (milling or grinding) in order to attain the required mechanical properties. Accordingly, the design process does not need to account for the shrinkage of more than 10 percent involved in conventional milling and grinding processes of dental articles, wherein green bodies are used.

Ceramic materials from which the blank portions according to the invention can be manufactured are polycrystalline materials of which in turn the oxide ceramics are preferred, which are particularly suitable as starting material for the blanks according to the invention.

The terms "oxide ceramic" or "oxide ceramics" relate to materials which are different from materials referred to as "silicate ceramics". Oxide ceramics are based on simple oxides of metals including aluminium oxide ($Al_2O_3$), zirconium dioxide ($ZrO_2$), titanium dioxide ($TiO_2$) and magnesium oxide (MgO) which contain mainly crystalline phases. Preferably, the oxide ceramics are based on zirconium dioxide.

Zirconium dioxide may be modified by the addition of suitable metal oxides for stabilizing the high-temperature modification of zirconium dioxide at lower temperatures. Suitable metal oxides are for example yttrium oxide ($Y_2O_3$), calcium oxide (CaO), magnesium oxide (MgO), and cerium oxide (CeO, $Ce_2O_3$).

According to a further embodiment, oxide ceramics may be mixed oxide ceramics based on aluminum oxide ($Al_2O_3$) and zirconium dioxide ($ZrO_2$) as main components. For example, mixed oxide ceramics containing 70% to 90% aluminum oxide, the remainder comprised of zirconium dioxide, or containing 70% to 80% zirconium dioxide, the remainder comprised of aluminum oxide.

The ceramic is preferably densely-sintered, and only has a low residual porosity. Specifically, the ceramic may be densely-sintered so that the ceramic is at least about 90%, preferably 99% of its maximum or fully sintered density so that the residual porosity is less than 10%, preferably 1%.

According to a further preferred embodiment the blank portions are comprised of glass ceramics. The blank portions may preferably have the following composition in percentage by weight:

| | |
|---|---|
| $SiO_2$ | 58.1 ± 2.0 |
| $P_2O_5$ | 5.0 ± 1.5 |
| $Al_2O_3$ | 4.0 ± 2.5 |
| $Li_2O$ | 16.5 ± 4.0 |
| $K_2O$ | 2.0 ± 0.2 |
| $ZrO_2$ | 10.0 ± 0.5 |
| $CeO_2$ | 0-3, preferably 1.5 ± 0.6 |
| $Tb_4O_7$ | 0-3, preferably 1.2 ± 0.4, |
| $Na_2O$ | 0-0.5, preferably 0.2-0.5 | wherein the total sum is 100% by weight.

The blank portion may be formed from the glass melt during cooling or after cooling to room temperature, with the blank then undergoing at least a first heat treatment W1 at a temperature $T_{W1}$ over a period of time $t_{W1}$, wherein $620°$ C.$\leq T_{W1} \leq 800°$ C., in particular $650°$ C.$\leq T_{W1} \leq 750°$ C., and/or 1 minute$\leq t_{W1} \leq 200$ minutes, preferably 10 minutes$\leq t_{W1} \leq 60$ minutes. The form body is fabricated from the blank/heat-treated blank.

A blank according to the invention may be colored by using color additives such as metal atoms or metal ions of the rare-earth elements or of the elements of the d- or f-block of the periodic table.

A blank portion may be colored uniformly in one color or in one color shade. However, it is also possible to provide different color layers or to color the blank portion with a color gradient, wherein the color then changes starting continuously from a starting color to a final color.

The plate-shaped body comprises two or more through holes, wherein each through hole is contiguous with at least one of the ceramic or glass ceramic blank portions for receiving a working end of a milling or grinding tool of the CAM system. A through hole may be inside the contour of the blank portion or outside the contour of the blank portion. In each case, the through hole is such that the working end of the milling or grinding tool may enter the blank without milling or grinding along its longitudinal axis. According to a specific embodiment, a through hole is contiguous with a single blank portion whereby the through hole is used for machining the specific blank portion.

Alternatively, a through hole may be contiguous with multiple blank portions whereby the through hole may be used for machining each of the multiple blank portions.

According to a further embodiment, a blank portion is contiguous with two or more through holes whereby any of the through holes may be used for machining the blank portion. For example, the blank portion may be used for preparing multiple dental article each prepared by using a different through hole.

According to a preferred embodiment the blank has multiple preformed through holes distributed across the surface of the one or more sintered ceramic blank portions.

The shape of the through hole is not particularly limited provided the size thereof is sufficiently large to allow a working end of a milling or grinding tool of the CAM system to be received in the through hole. According to a further preferred embodiment, the one or more preformed through holes are circular or elongated holes. The diameter of a circular through hole is preferably in the range of from 1 to 20 mm, more preferably 2 to 10 mm. The length of an elongated hole is preferably in the range of from 5 to 100 mm, more preferably 10 to 50 mm, whereby the width of the elongated hole may be selected similar to the diameter of a circular through hole. Preferably, a preformed through hole is positioned at the center of gravity of the disk. Accordingly, the CAM software is able to determine the position of the through hole based on the dimensions of the disk so that the working end of the milling or grinding tool may be introduced into the through hole by determining the position of the center of gravity of the blank. Specifically, in case of a cylindrical disk, the center of gravity is the center of the disk.

In case of a blank which has a through hole which is not at the center of gravity of the blank, the specific position of the through hole must be available to the CAM software. According to a preferred embodiment, a blank having a through hole which is not at the center of gravity of the blank further comprises a feature such as a slot for engaging a corresponding feature of the blank holder of the CAM system. Preferably, the feature is provided on an adapter attached to the circumference of the plate-shaped body of the blank. The blank including the position of the through hole in relation to the feature may be represented in digital form so that the CAM software is able to derive the position of the through holes when the blank is form-fitted in the blank holder of the CAM system. The representation of the blank may preferably represent the surface of the blank or a portion thereof including the through holes. According to a preferred embodiment, the surface geometry of the three-dimensional blank is described in a computer-readable format, such as a STL file encoding the surface geometry by using the concept of tesselation.

The present invention is also directed to a non-transitory, computer-readable medium storing a digital representation of the blank of the present invention including the position of the through hole in relation to a feature. Preferably, the digital representation is in the STL file format.

The Kit-of-Parts

According to a second aspect, the present invention provides a kit-of-parts comprising at least two blanks as defined by the present invention according to the first aspect, wherein each blank is coded to identify the color of the one or more ceramic or glass ceramic blank portions.

The color coding may be preferably based on a color coding system used in the dental field such as the VITA Shade system.

The Process for Preparing a Blank

According to a third aspect, the present invention provides a process for preparing a blank as defined by the present invention according to the first aspect, which comprises forming two or more through holes at two or more predetermined locations on the surface of a plate-shaped body adapted to be received in a blank holder of a CAM system.

According to a first embodiment, the plate-shaped body is a ceramic or glass ceramic blank portion containing two or more through holes within its contour. Accordingly, the process according to the invention comprises forming two or more through holes at two or more predetermined locations on the surface of ceramic or glass ceramic blank portion which is adapted to be received in a blank holder of a CAM system. The blank portion may be formed by preparing and shaping a pre-sintered ceramic material into the desired shape of the blank portion, and subsequently heat treating the pre-sintered ceramic material. The two or more through holes may be formed in the pre-sintered material or after sintering in order to prepare the final blank portion. For example, a ceramic precursor powder may be combined with a binder and pressed into a suitable shape to form green bodies. Injection moulding, pressing and extrusion are suitable techniques for preparing green bodies. The green bodies may be pre-sintered to a density less than about eighty five percent of the final density. The pre-sintered blocks may then be machined to a desired shape and sintered to a final density for providing a blank portion.

According to a second embodiment, the plate-shaped body comprises one or more ceramic or glass ceramic blank portions. Accordingly, the process according to the invention comprises forming two or more through holes at two or more predetermined locations on the plate-shaped body which are adapted to be received in a blank holder of a CAM system. For example, ceramic or glass ceramic blank portions may be prepared which are attached to a framework so as to provide through holes contiguous with the ceramic or glass ceramic blank portions in the plate-shaped body.

The Subtractive Process Using the Blank

According to a fourth aspect, the present invention provides a subtractive process for preparing one or more dental articles, comprising the following steps:

(i) providing a blank as defined by the present invention according to the first aspect;

(ii) mounting the blank on a blank holder of a CAM system, wherein the CAM system further comprises a milling or grinding machine comprised of a milling or grinding tool having a working end;

(iii) positioning the working end of the milling or grinding tool in a preformed through hole of the blank, adjacent to a flat or concave inner wall of the preformed through hole; and (iv) enlarging the preformed through hole by milling or grinding the flat or concave inner wall of the preformed through hole with the working end of the milling or grinding tool so that at least a portion of a convex contour of the dental article is prepared.

Preferably, the blank according to the first aspect is a disk having a diameter of about 98.5 mm.

The mounting of the blank on a blank holder of a CAM system may preferably use slots provided on the circumference of the blank. The blank may be secured by any conventional means used in a CAM system.

The CAM system further comprises a milling or grinding machine comprised of a milling or grinding tool having a working end.

The working end of the milling or grinding tool is positioned in a preformed through hole of the blank adjacent to a flat or concave inner wall of the preformed through hole. Preferably, only the lateral portions of the working end of the milling or grinding tool are in contact with the blank portion. More preferably, the contact of the working end at any given moment is limited to lateral points which are within a range of at least 50 percent of the maximum tangential velocity of the working end of the milling or grinding tool.

The preformed through hole is enlarged by milling or grinding the flat or concave inner wall of the preformed through hole with the working end of the milling or grinding tool so that at least a portion of a convex contour of the dental article is prepared. Accordingly, the through hole is outside of the milling silhouette of the dental article when the milling or grinding tool is positioned in the preformed through hole.

The Computer-Implemented Method Using the Blank

According to a fifth aspect, the present invention provides a computer-implemented method for preparing a dental article which comprises the steps of:

(a) determining the type of a blank having two or more preformed through holes as defined by the first aspect, mounted on a blank holder of a milling machine of a CAM system;

(b) controlling the CAM system so that a working end of a milling or grinding tool of the milling machine is received in a preformed through hole of the blank;

(c) controlling the working end of the milling or grinding tool so that the preformed through hole is enlarged by the tool into at least a portion of a convex contour of the dental article.

The type of a blank having two or more preformed through holes as defined by the first aspect, mounted on a blank holder of a milling machine of a CAM system, is determined. The determination may be carried out by reading a manual user input, a barcode, a database, or any other step which allows to unambiguously identify the blank.

According to a preferred embodiment, the CAM system checks if a digital representation of the specific type of blank is available. In case a digital representation of the specific type of blank is not available, the CAM system may download a digital representation of the specific type of blank over a network such as the internet, if necessary.

Subsequently, the CAM system is controlled so that a working end of a milling or grinding tool of the milling machine is received in a preformed through hole of the blank. For this purpose, the positions of the two or more through holes of the blank must be available to the CAM system. Accordingly, it is preferred that the computer system has access to or stores a digital representation of the blank, preferably in the STL format. Based on the virtual representation of the blank, the CAM system may determine the center of gravity of the blank when a through hole is positioned in the center of the blank. Alternatively, the CAM system may use the digital representation of the blank to derive the position of the two or more through holes with reference to the feature of the blank adapted to engage a corresponding feature on the blank holder at a position stored in the CAM system.

The working end of the milling or grinding tool is controlled so that the preformed through hole is enlarged by the tool into at least a portion of a convex contour of the dental article.

The Non-Transitory, Computer-Readable Medium

The present invention further comprises a non-transitory, computer-readable medium. The medium comprises a program executable for carrying out the computer-implemented method for preparing a dental article according to the present invention. The medium further comprises a digital representation of a blank as defined by the present invention. Preferably, the digital representation is in the STL format.

Based on the digital representation of the blank, the program executable may determine the position of the through holes relative to a known position on the blank holder which is used to orient the blank in the holder.

The present invention will now be further explained with reference to the figures.

FIG. 1 shows a first embodiment of the blank 10 for milling or grinding a dental article, wherein a plate-shaped body 12 is a blank portion 14 entirely comprised of a ceramic or glass ceramic material, wherein a single through hole 20 is formed. The blank 10 has a plate-shaped body 12 adapted to be received in a blank holder of a CAM system (not shown). For this purpose, the plate-shaped body comprises an adapter 15. The adapter 15 is provided around the circumference of the plate shaped body 12. Alternatively, the adapter 15 may be integral with the plate-shaped body, e.g. the circumference of the plate-shaped body may be shaped to correspond to the shape of the blank holder. The plate-shaped body 12 comprises one ceramic or glass ceramic blank portion 14 and one circular through hole 20 contiguous with the ceramic or glass ceramic blank portion 14 for receiving a working end of a milling or grinding tool of the CAM system. The through hole 20 is at the center of gravity of the plate-shaped body and within the contour of the blank portion. Therefore, the CAM system may easily determine the position of the through hole independent from the orientation of the blank in the blank holder.

Figure 2:
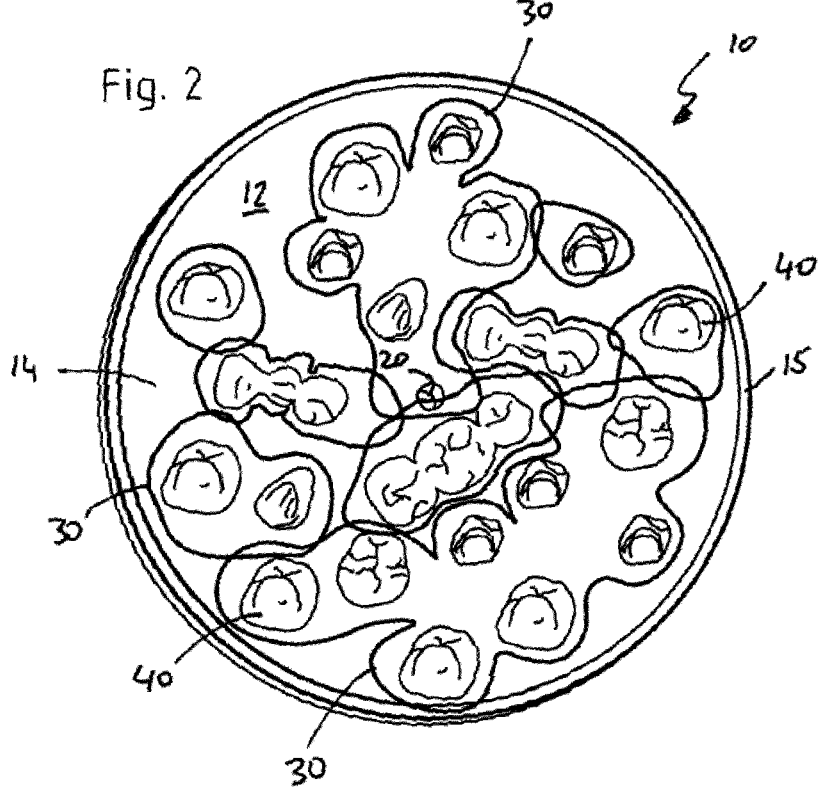
FIG. 2 shows the first embodiment of a blank of the present invention, wherein the milling silhouettes of dental articles are indicated on the plate-shaped body.

FIG. 2 shows the first embodiment of the blank 10 of FIG. 1, wherein a plate-shaped body 12 is a blank portion 14 entirely comprised of a ceramic or glass ceramic material, wherein a single through hole 20 is formed. FIG. 2 shows milling silhouettes 30 for preparing dental articles 40. In the preparation of the dental articles, the working end of the milling or grinding tool is introduced first into the through hole 20 in order to prepare the first dental article contiguous with the through hole 20. The preparation of the first dental article increases through hole 20 and provides access to the milling silhouette of a second dental article contiguous with the increased through hole 20. Accordingly, a majority or substantially all of the plate-shaped body 12 may be consumed by starting out from the through hole 20 of the blank 10 while avoiding excessive wear of the milling or grinding tools. According to FIG. 2, the through hole 20 is at the center of gravity of the blank, i. e. at the center of the plate-shaped body, which is preferred in view of the fact that the milling or grinding tool may easily be inserted into the through hole at this location.

Figure 3:
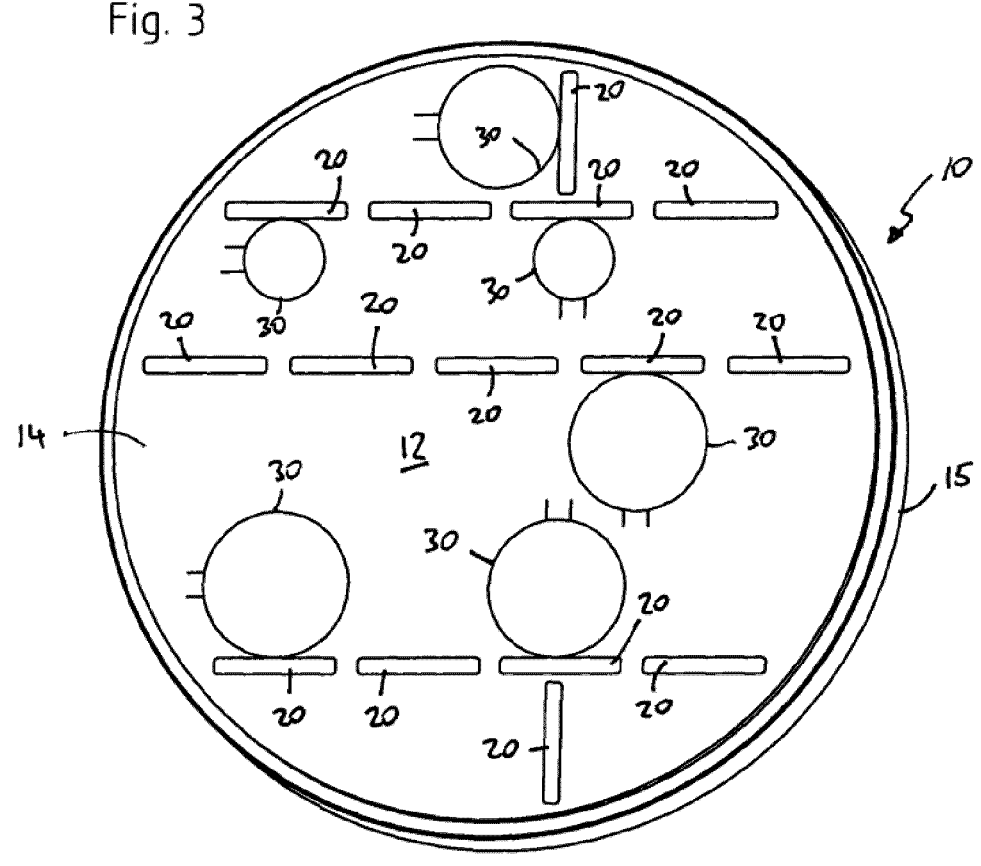
FIG. 3 shows a second embodiment of a blank of the present invention, wherein a plate-shaped body represents a blank portion comprised of a ceramic or glass ceramic material, wherein multiple through holes are formed.

FIG. 3 shows the second embodiment of the blank 10 according to the present invention, wherein a plate-shaped body 12 is a blank portion 14 entirely comprised of a ceramic or glass ceramic material, wherein multiple elongated through holes 20 are formed. An adapter 15 is provided which holds the plate-shaped body at the circumference and which is designed to form-fit into the blank holder of a CAM system (not shown). The plate-shaped body 12 comprises one ceramic or glass ceramic blank portion 14 and fifteen elongated through holes 20 contiguous with the ceramic or glass ceramic blank portion 14 for receiving a working end of a milling or grinding tool of the CAM system. The through holes 20 are distributed across the plate-shaped body and within the contour of the blank portion. FIG. 3 shows milling silhouettes 30 for preparing dental articles. In the preparation of the dental articles, the working end of the milling or grinding tool is introduced into one of the elongated through holes 20 in order to prepare a dental article contiguous with the through hole 20. A second dental article and any further may be prepared by introducing the working end of the milling or grinding tool into a different elongated through hole 20. Accordingly, a majority or substantially all of the plate-shaped body 12 may be consumed by using each of the fifteen elongated through holes while avoiding excessive wear of the milling or grinding tools.

Figure 4:
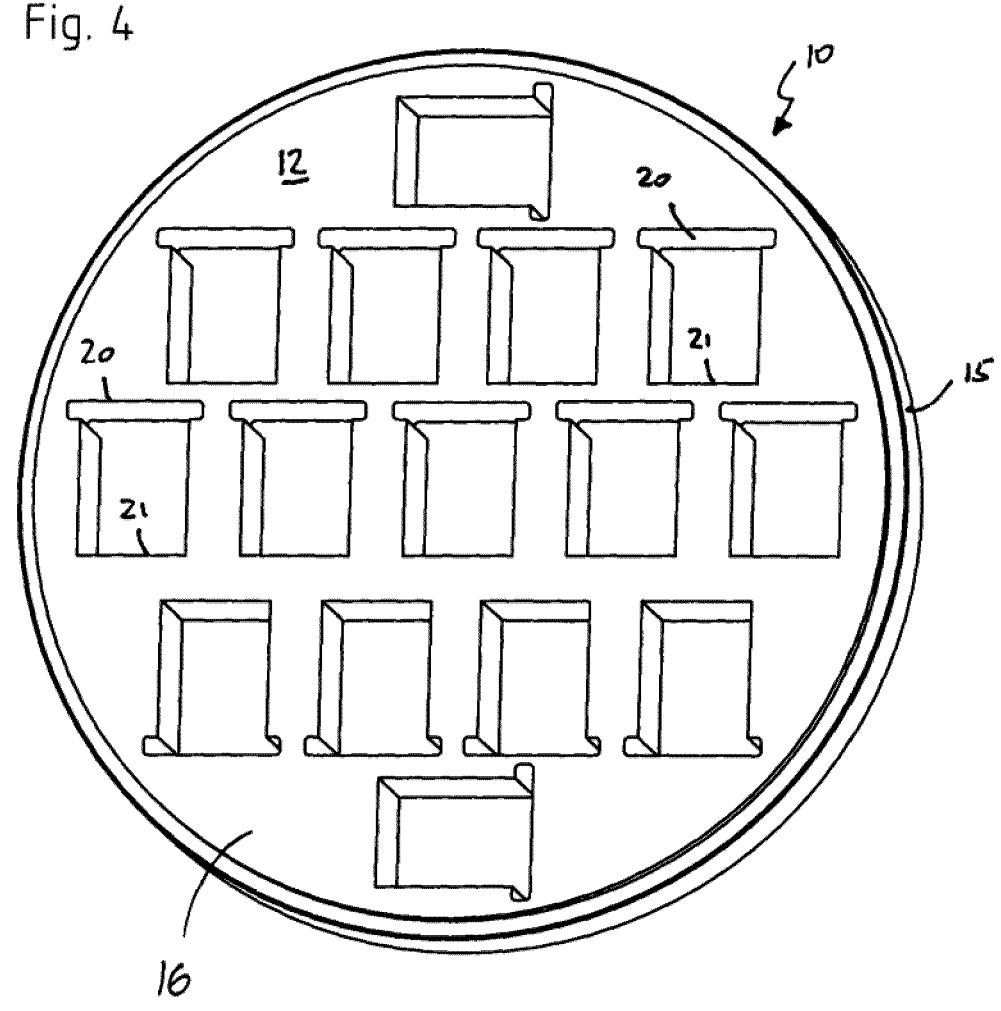
FIG. 4 shows a third embodiment of a blank of the present invention, wherein a plate-shaped body comprises multiple openings for receiving multiple blank portions of a ceramic or glass ceramic material, wherein each blank portion is contiguous with its own dedicated through hole.

FIG. 4 shows a framework 16 of a third embodiment of the blank 10 for milling or grinding a dental article, wherein a plate-shaped body 12 comprises multiple blank portions (not shown) of a ceramic or glass ceramic material, wherein each blank portion is contiguous with its own dedicated elongated through hole 20 and fixed in corresponding openings 21 of the framework 16. The framework 16 of the blank 10 is adapted to be received in a blank holder of a CAM system (not shown). For this purpose, the framework comprises an adapter 15. The adapter 15 is provided around the circumference of the framework 16. The framework 16 comprises fifteen openings 21 for positioning fifteen ceramic or glass ceramic blank portion 14 (not shown) contiguous with fifteen elongated through holes 20 for receiving a working end of a milling or grinding tool of the CAM system. The openings 21 for ceramic or glass ceramic blank portions 14 and elongated through holes 20 are distributed across the plate-shaped body. In the preparation of the dental articles, the working end of the milling or grinding tool is introduced into one of the elongated through holes 20 in order to prepare a dental article using a blank portion contiguous with the through hole 20. A second and any further dental article may be prepared by introducing the working end of the milling or grinding tool into a different elongated through hole 20. Accordingly, a majority or substantially all of the plate-shaped body 12 may be consumed by using each of the fifteen ceramic or glass ceramic blank portions 14 and elongated through holes while avoiding excessive wear of the milling or grinding tools.

Figures 5, 6:
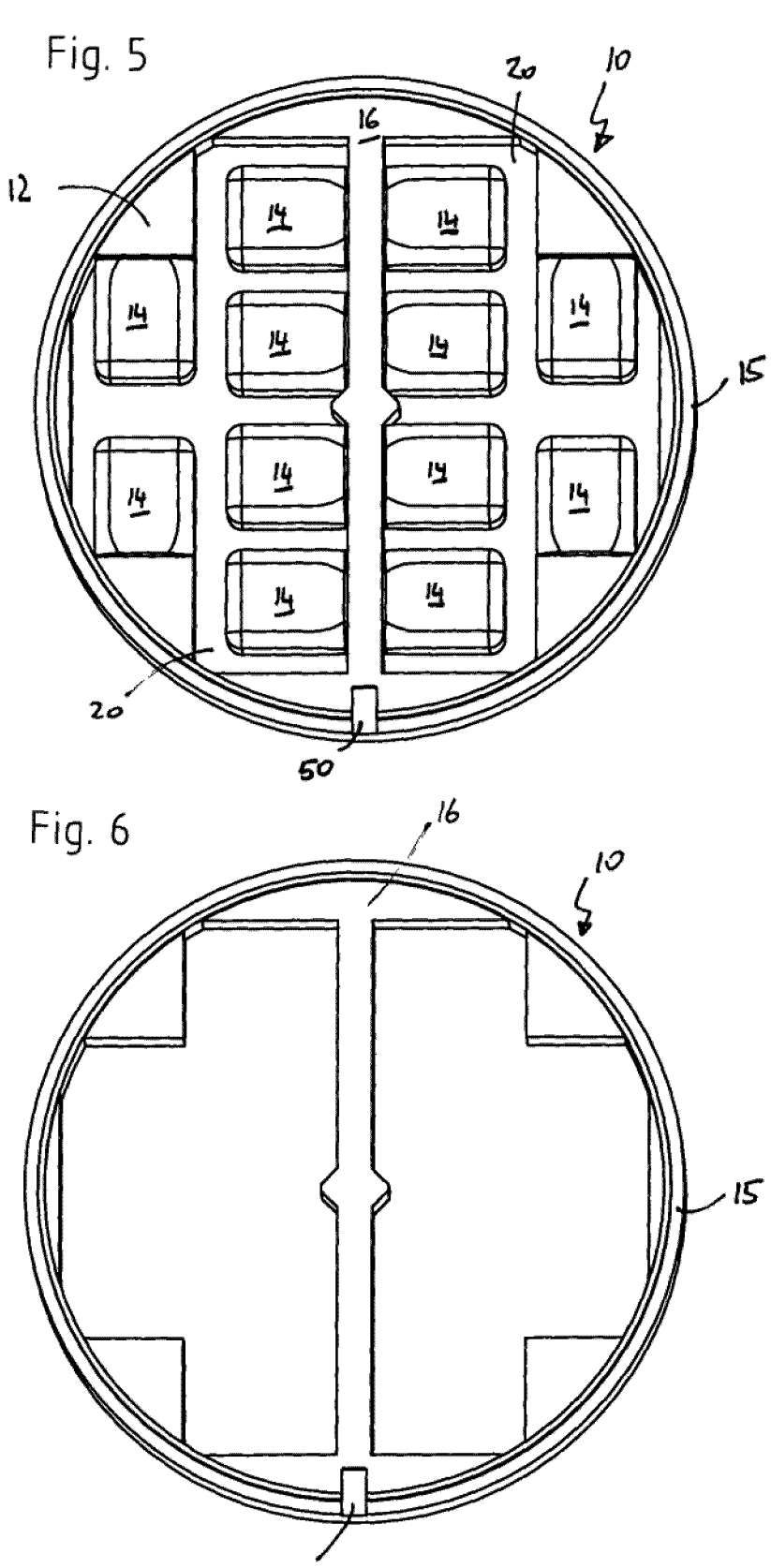
FIG. 5 shows a fourth embodiment of a blank of the present invention, wherein a plate-shaped body comprises multiple blank portions of a ceramic or glass ceramic material, wherein each blank portion is contiguous with a through hole shared by multiple blank portions.
FIG. 6 shows the embodiment of FIG. 5, wherein the framework of the plate-shaped body without blank portions of a ceramic or glass ceramic material are shown.

FIG. 5 shows a fourth embodiment of the blank 10 for milling or grinding a dental article, wherein each blank portion 14 is contiguous with a through hole 20 shared by multiple blank portions. The blank 10 has a framework 16 of the plate-shaped body 12 adapted to be received in a blank holder of a CAM system (not shown). For this purpose, the plate-shaped body 12 comprises an adapter 15. The adapter 15 is provided around the circumference of the plate-shaped body 12. The plate-shaped body 12 comprises twelve ceramic or glass ceramic blank portions 14 and two through holes 20, each contiguous with six of the ceramic or glass ceramic blank portions 14 for receiving a working end of a milling or grinding tool of the CAM system. A marking in the form of a slot 50 is provided at the circumference for positioning the blank 10 in a blank holder in a predetermined orientation when the slot 50 engages a corresponding protrusion of the blank holder.

FIG. 6 shows the framework 16 of the embodiment of FIG. 5, wherein the framework 16 of the plate-shaped body without blank portions of a ceramic or glass ceramic material are shown.

The invention claimed is:

1. A blank for milling or grinding a dental article, the blank having a plate-shaped body adapted to be received in a blank holder of a CAM system, which plate-shaped body comprises a framework having a plurality of openings that hold a plurality of ceramic or glass ceramic blank portions, two or more through holes, and one or more slots at the circumference of the plate-shaped body for orienting the blank in a blank holder of a CAM system, wherein each through hole is contiguous with at least one of the ceramic or glass ceramic blank portions for receiving a working end of a milling or grinding tool of the CAM system, wherein each of the one or more slots includes a slot opening formed adjacent an outer periphery of the plate-shaped body, the slot opening shaped to engage with a protrusion extending from a blank holder of the CAM system, and wherein the one or more slots are provided on an adapter that is attached to the circumference of the plate-shaped body of the blank.

2. The blank according to claim 1, wherein the two or more through holes are circular or elongated holes.

3. The blank according to claim 1, wherein the plate-shaped body comprises 2 to 50 through holes; wherein each through hole is a circular or elongated hole.

4. The blank according to claim 1, wherein said framework comprises 2 to 50 openings adapted to hold ceramic or glass ceramic blank portions.

5. The blank according to claim 1, wherein each through hole is contiguous with a single blank portion.

6. The blank according to claim 1, wherein at least one through hole is contiguous with multiple blank portions.

7. Kit-of-parts comprising at least two blanks as defined by claim 1, wherein each blank is coded to identify the color of the plurality of the ceramic or glass ceramic blank portions.

8. The blank according to claim 1, wherein the two or more through holes are not at a center of gravity of the blank.

9. The blank according to claim 1, wherein the two or more through holes are shaped different from the plurality of openings.

10. The blank according to claim 1, wherein the ceramic or glass ceramic blank portions have composition in percentage by weight:

| | |
|---|---|
| $SiO_2$ | $58.1 \pm 2.0$ |
| $P_2O_5$ | $5.0 \pm 1.5$ |
| $Al_2O_3$ | $4.0 \pm 2.5$ |
| $Li_2O$ | $16.5 \pm 4.0$ |
| $K_2O$ | $2.0 \pm 0.2$ |
| $ZrO_2$ | $10.0 \pm 0.5$ |
| $CeO_2$ | $1.5 \pm 0.6$ |
| $Tb_4O_7$ | $1.2 \pm 0.4,$ |
| $Na_2O$ | $0.2$-$0.5$ | wherein the total sum is 100% by weight, and
wherein the two or more through holes are not at the center of gravity of the blank.

11. The blank according to claim 1, wherein the plate-shaped body has a dimension of thickness and a dimension of length in a direction perpendicular to the thickness, and each through hole is an elongated hole extending along the direction of the length of the plate-shaped body and passing through in the direction of the thickness of the plate-shaped body.

12. Process for preparing a blank as defined in claim 1, which comprises the step of: forming two or more through holes at two or more predetermined locations on the surface of a plate-shaped body adapted to be received in a blank holder of a CAM system.

13. A subtractive process for preparing one or more dental articles, comprising the steps of:

(i) providing a blank as defined in claim 1;

(ii) mounting the blank on a blank holder of a CAM system, wherein the CAM system further comprises a milling or grinding machine comprised of a milling or grinding tool having a working end;

(iii) positioning the working end of the milling or grinding tool in a preformed through hole of the blank, adjacent to a flat or concave inner wall of the preformed through hole; and (iv) enlarging the preformed through hole by milling or grinding the flat or concave inner wall of the preformed through hole with the working end of the milling or grinding tool so that at least a portion of a convex contour of the dental article is prepared.

* * * * *